United States Patent
Hall

(10) Patent No.: US 11,392,789 B2
(45) Date of Patent: Jul. 19, 2022

(54) FINGERPRINT AUTHENTICATION USING A SYNTHETIC ENROLLMENT IMAGE

(71) Applicant: InvenSense, Inc., San Jose, CA (US)

(72) Inventor: Daniela Hall, Eybens (FR)

(73) Assignee: InvenSense, Inc., San Jose, CA (US)

( * ) Notice: Subject to any disclaimer, the term of this patent is extended or adjusted under 35 U.S.C. 154(b) by 93 days.

(21) Appl. No.: 16/659,069

(22) Filed: Oct. 21, 2019

(65) Prior Publication Data

US 2021/0117721 A1  Apr. 22, 2021

(51) Int. Cl.
*G06K 9/62* (2022.01)
*G06F 21/32* (2013.01)
*G06V 40/50* (2022.01)
*G06V 40/13* (2022.01)
*G06V 40/12* (2022.01)

(52) U.S. Cl.
CPC ............ *G06K 9/6255* (2013.01); *G06F 21/32* (2013.01); *G06V 40/1306* (2022.01); *G06V 40/1365* (2022.01); *G06V 40/50* (2022.01)

(58) Field of Classification Search
CPC .............. G06K 9/6255; G06K 9/00926; G06K 9/00087; G06K 9/0002; G06F 21/32
See application file for complete search history.

(56) References Cited

U.S. PATENT DOCUMENTS

| | | | |
|---|---|---|---|
| 4,880,012 A | 11/1989 | Sato | |
| 5,575,286 A | 11/1996 | Weng et al. | |
| 5,684,243 A | 11/1997 | Gururaja et al. | |
| 5,808,967 A | 9/1998 | Yu et al. | |
| 5,867,302 A | 2/1999 | Fleming | |
| 5,911,692 A | 6/1999 | Hussain et al. | |
| 6,071,239 A | 6/2000 | Cribbs et al. | |
| 6,104,673 A | 8/2000 | Cole et al. | |
| 6,289,112 B1 | 9/2001 | Jain et al. | |
| 6,292,576 B1 | 9/2001 | Brownlee | |

(Continued)

FOREIGN PATENT DOCUMENTS

| CN | 1826631 A | 8/2006 |
|---|---|---|
| CN | 101192644 A | 6/2008 |

(Continued)

OTHER PUBLICATIONS

ISA/EP, International Search Report and Written Opinion for International Application No. PCT/US2017/031431, 14 pages, dated Aug. 1, 2017.

(Continued)

*Primary Examiner* — Edward F Urban
*Assistant Examiner* — Wassim Mahrouka

(57) ABSTRACT

In a method for fingerprint authentication, a fingerprint image is received from a fingerprint sensor. Fingerprint authentication of the fingerprint image is performed by comparing the fingerprint image to a set of authentication fingerprint images including at least one enrollment fingerprint image and at least one transformed fingerprint image, where the transformed fingerprint image is generated by applying a transfer function to at least one enrollment fingerprint image of the set of authentication fingerprint images, and where the transfer function is for simulating fingerprint image acquisition during a predefined environmental condition.

20 Claims, 8 Drawing Sheets

(56) References Cited

U.S. PATENT DOCUMENTS

| | | |
|---|---|---|
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,618,405 B2 | 4/2017 | Liu et al. |
| 9,665,763 B2 | 5/2017 | Du |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,933,319 B2 | 4/2018 | Li et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,006,824 B2 | 6/2018 | Tsai et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,325,915 B2 | 6/2019 | Salvia et al. |
| 10,387,704 B2 | 8/2019 | Dagan et al. |
| 10,445,547 B2 | 10/2019 | Tsai |
| 10,461,124 B2 | 10/2019 | Berger et al. |
| 10,478,858 B2 | 11/2019 | Lasiter et al. |
| 10,488,274 B2 | 11/2019 | Li et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,726,231 B2 | 7/2020 | Tsai et al. |
| 10,755,067 B2 | 8/2020 | De Foras et al. |
| 11,107,858 B2 | 8/2021 | Berger et al. |
| 2001/0016686 A1 | 8/2001 | Okada et al. |
| 2002/0062086 A1 | 5/2002 | Miele et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki |
| 2005/0162040 A1 | 7/2005 | Robert |
| 2006/0052697 A1 | 3/2006 | Hossack et al. |
| 2006/0079777 A1 | 4/2006 | Karasawa |
| 2006/0210130 A1 | 9/2006 | Germond-Rouet et al. |
| 2006/0230605 A1 | 10/2006 | Schlote-Holubek et al. |
| 2006/0280346 A1 | 12/2006 | Machida |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0163805 A1 | 6/2009 | Sunagawa et al. |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0063391 A1 | 3/2010 | Kanai et al. |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095347 A1 | 4/2012 | Adam et al. |
| 2012/0147698 A1 | 6/2012 | Wong et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0003679 A1* | 1/2014 | Han .................. G06K 9/00087 |
| | | 382/124 |

(56) References Cited

U.S. PATENT DOCUMENTS

| | | |
|---|---|---|
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0324569 A1 | 11/2015 | Hong et al. |
| 2015/0345987 A1 | 12/2015 | Hajati |
| 2015/0357375 A1 | 12/2015 | Tsai et al. |
| 2015/0358740 A1 | 12/2015 | Tsai et al. |
| 2015/0362589 A1 | 12/2015 | Tsai |
| 2015/0371398 A1 | 12/2015 | Qiao et al. |
| 2016/0041047 A1 | 2/2016 | Liu et al. |
| 2016/0051225 A1 | 2/2016 | Kim et al. |
| 2016/0063294 A1 | 3/2016 | Du et al. |
| 2016/0063300 A1 | 3/2016 | Du |
| 2016/0070967 A1 | 3/2016 | Du |
| 2016/0070968 A1 | 3/2016 | Gu et al. |
| 2016/0086010 A1 | 3/2016 | Merrell et al. |
| 2016/0091378 A1 | 3/2016 | Tsai et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0299014 A1 | 10/2016 | Li et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004346 A1* | 1/2017 | Kim .................. G06K 9/00926 |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0059380 A1 | 3/2017 | Li et al. |
| 2017/0075700 A1 | 3/2017 | Abudi et al. |
| 2017/0076132 A1* | 3/2017 | Sezan .................... G06F 21/32 |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0243049 A1 | 8/2017 | Dong |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0344782 A1 | 11/2017 | Andersson |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0150679 A1* | 5/2018 | Kim .................. G06K 9/00892 |
| 2018/0178251 A1 | 6/2018 | Foncellino et al. |
| 2018/0206820 A1 | 7/2018 | Anand et al. |
| 2018/0217008 A1 | 8/2018 | Li et al. |
| 2018/0225495 A1 | 8/2018 | Jonsson et al. |
| 2018/0229267 A1 | 8/2018 | Ono et al. |
| 2018/0268232 A1 | 9/2018 | Kim et al. |
| 2018/0276443 A1 | 9/2018 | Strohmann et al. |
| 2018/0276672 A1 | 9/2018 | Breed et al. |
| 2018/0329560 A1 | 11/2018 | Kim et al. |
| 2018/0341799 A1 | 11/2018 | Schwartz et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0043920 A1 | 2/2019 | Berger et al. |
| 2019/0046263 A1 | 2/2019 | Hayashida et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0095015 A1 | 3/2019 | Han et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0175035 A1 | 6/2019 | Van Der Horst et al. |
| 2019/0188441 A1 | 6/2019 | Hall et al. |
| 2019/0188442 A1 | 6/2019 | Flament et al. |
| 2019/0247887 A1 | 8/2019 | Salvia et al. |
| 2019/0311177 A1 | 10/2019 | Joo et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0111834 A1 | 4/2020 | Tsai et al. |
| 2020/0125710 A1 | 4/2020 | Andersson et al. |
| 2020/0147644 A1 | 5/2020 | Chang |
| 2020/0158694 A1 | 5/2020 | Garlepp et al. |
| 2020/0175143 A1 | 6/2020 | Lee et al. |
| 2020/0194495 A1 | 6/2020 | Berger et al. |
| 2020/0210666 A1 | 7/2020 | Flament |
| 2020/0250393 A1 | 8/2020 | Tsai et al. |
| 2020/0285882 A1 | 9/2020 | Skovgaard Christensen et al. |
| 2020/0302140 A1 | 9/2020 | Lu et al. |
| 2020/0342203 A1* | 10/2020 | Lin .................. G06K 9/00026 |
| 2020/0355824 A1 | 11/2020 | Apte et al. |
| 2020/0400800 A1 | 12/2020 | Ng et al. |

(56) References Cited

U.S. PATENT DOCUMENTS

| | | |
|---|---|---|
| 2020/0410070 A1 | 12/2020 | Strohmann |
| 2020/0410193 A1 | 12/2020 | Wu |

FOREIGN PATENT DOCUMENTS

| | | |
|---|---|---|
| CN | 102159334 A | 8/2011 |
| CN | 105264542 A | 1/2016 |
| CN | 105378756 A | 3/2016 |
| CN | 106458575 B | 7/2018 |
| CN | 109196671 A | 1/2019 |
| CN | 109255323 A | 1/2019 |
| EP | 1214909 A1 | 6/2002 |
| EP | 2884301 A1 | 6/2015 |
| EP | 3086261 A2 | 10/2016 |
| EP | 1534140 B1 | 1/2019 |
| EP | 3292508 B1 | 12/2020 |
| EP | 3757884 A1 | 12/2020 |
| JP | 2011040467 A | 2/2011 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016022439 A1 | 2/2016 |
| WO | 2016040333 A2 | 3/2016 |
| WO | 2016053587 A1 | 4/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192890 A1 | 11/2017 |
| WO | 2017192895 A1 | 11/2017 |
| WO | 2017192899 A1 | 11/2017 |
| WO | 2017196678 A1 | 11/2017 |
| WO | 2017196681 A1 | 11/2017 |
| WO | 2017196682 A1 | 11/2017 |
| WO | 2017192903 A3 | 12/2017 |
| WO | 2018148332 A1 | 8/2018 |
| WO | 2019005487 A1 | 1/2019 |
| WO | 2019164721 A1 | 8/2019 |
| WO | 2020081182 A1 | 4/2020 |

OTHER PUBLICATIONS

ISA/EP, International Search Report and Written Opinion for International Application No. PCT/US2017/031434, 13 pages, dated Jun. 26, 2017.

ISA/EP, International Search Report and Written Opinion for International Application No. PCT/US2017/031439, 10 pages, dated Jun. 20, 2017.

ISA/EP, International Search Report and Written Opinion for International Application No. PCT/US2017/031824, 18 pages, dated Sep. 22, 2017.

ISA/EP, International Search Report and Written Opinion for International Application No. PCT/US2017/031827, 16 pages, dated Aug. 1, 2017.

ISA/EP, International Search Report and Written Opinion for International Application No. PCT/US2017/031831, 12 pages, dated Jul. 21, 2017.

ISA/EP, International Search Report and Written Opinion for International Application No. PCT/US2018/037364, 10 pages, dated Sep. 3, 2018.

ISA/EP, International Search Report and Written Opinion for International Application No. PCT/US2019061516, 14 pages, dated Mar. 12, 2020.

ISA/EP, International Search Report and Written Opinion for International Application No. PCT/US2020/033854, 16 pages, dated Nov. 3, 2020.

ISA/EP, International Search Report and Written Opinion for International Application No. PCT/US2020/039208, 10 pages, dated Oct. 9, 2020.

ISA/EP, International Search Report and Written Opinion for International Application No. PCT/US2020/039452, 11 pages, dated Sep. 9, 2020.

ISA/EP, International Search Report and Written Opinion for International Application No. PCT/US2020/042427, 18 pages, dated Dec. 14, 2020.

ISA/EP, International Search Report and Written Opinion for International Application No. PCT/US2020/042428, 9 pages, dated Oct. 26, 2020.

ISA/EP, International Search Report and Written Opinion for International Application No. PCT/US2021/021412, 12 pages, Jun. 9, 2021.

ISA/EP, International Search Report and Written Opinion for International Application No. PCT/US2021/021561, 9 pages, dated Jun. 28, 2021.

ISA/EP, International Search Report for International Application No. PCT/US2017/031826, 16 pages, dated Feb. 27, 2018.

ISA/EP, Partial International Search Report for International Application No. PCT/US2017/031140, 13 pages, dated Aug. 29, 2017.

ISA/EP, Partial International Search Report for International Application No. PCT/US2017/031823, 12 pages, dated Nov. 30, 2017.

ISA/EP, Partial Search Report and Provisional Opinion for International Application No. PCT/US2020/042427, 13 pages, dated Oct. 26, 2020.

ISA/EP, Partial Search Report for International Application No. PCT/US2020/033854, 10 pages, dated Sep. 8, 2020.

"Moving Average Filters", Waybackmachine XP05547422, Retrieved from the Internet: URL:https://web.archive.org/web/20170809081353/https//www.analog.com/media/en/technical-documentation/dsp_book/dsp_book_Ch15.pdf —[retrieved on Jan. 24, 2019], Aug. 9, 2017, 1-8.

Office Action for CN App No. 201780029016.7 dated Mar. 24, 2020, 7 pages.

Office Action for CN App No. 201780029016.7 dated Sep. 25, 2020, 7 pages.

Office Action for TW App No. 106113266 dated Jun. 22, 2020, 23 pages.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

Sleep Mode, Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.

Taiwan Application No. 106114623, 1st Office Action, Dated Aug. 5, 2021, pp. 1-8.

TMS320C5515 Fingerprint Development Kit (FDK) Hardware Guide, Texas Instruments, Literature No. SPRUFX3, XP055547651, Apr. 2010, 1-26.

ZTE V7 Max. 5,5" smartphone on MediaTeck Helio P10 cpu; Published on Apr. 20, 2016; https://www.youtube.com/watch?v=ncNCbpkGQzU (Year: 2016).

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.

(56) References Cited

OTHER PUBLICATIONS

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.

Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Rozen, et al., "Air-Coupled Aluminum Nitride Piezoelectric Micromachined Ultrasonic Fransducers at 0.3 MHZ to 0.9 MHZ", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Tang, et al., "11.2 3D Ultrasonic Fingerprint Sensor-on-a-Chip", 2016 IEEE International Solid-State Circuits Conference, IEEE, Jan. 31, 2016, 202-203.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

Zhou, et al., "Partial Fingerprint Reconstruction with Improved Smooth Extension", Network and System Security, Springer Berlin Heidelberg, Jun. 3, 2013, 756-762.

Tang, et al., "Pulse-Echo Ultrasonic Fingerprint Sensor on a Chip", IEEE Transducers, Anchorage, Alaska, USA, Jun. 21-25, 2015, pp. 674-677.

ISA/EP, Partial International Search Report for International Application No. PCT/US2019/034032, 8 pages, dated Sep. 12, 2019, 8.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, dated Aug. 29, 2017.

ISA/EP, International Search Report and Written Opinion for International Application No. PCT/US2017/031127, 13 pages, dated Sep. 1, 2017.

ISA/EP, International Search Report and Written Opinion for International Application No. PCT/US2017/031134, 12 pages, Aug. 30, 2017.

ISA/EP, International Search Report and Written Opinion for International Application No. PCT/US2017/031140, 18 pages, dated Nov. 2, 2017.

ISA/EP, International Search Report and Written Opinion for International Application No. PCT/US2017/031421 13 pages, dated Jun. 21, 2017.

ISA/EP, International Search Report and Written Opinion for International Application No. PCT/US2017/031426 13 pages, dated Jun. 22, 2017.

"EP Office Action, for Application 17724184.1, dated Oct. 12, 2021, 6 pages".

"EP Office Action, dated Oct. 9, 2021, 6 pages".

"European Patent Office, Office Action, App 17725018, pp. 5, dated Oct. 25, 2021".

"European Patent Office, Office Action, App 17725020.6, pp. 4, dated Oct. 25, 2021".

Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.

* cited by examiner

FINGERPRINT AUTHENTICATION USING A SYNTHETIC ENROLLMENT IMAGE

BACKGROUND

Fingerprint sensors have become ubiquitous in mobile devices as well as other applications for authenticating a user's identity. They provide a fast and convenient way for the user to unlock a device, provide authentication for payments, etc. Current fingerprint sensors are typically area sensors that obtain a two-dimensional image of the user's finger area presented to the sensor. Different technologies can be used to image the finger such as capacitive, ultrasound, and optical sensing. Once an image is obtained, that image is processed by a matcher to extract features and to compare against stored images to authenticate the user. As such, accuracy of captured images is essential to the performance of image matching for user authentication.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
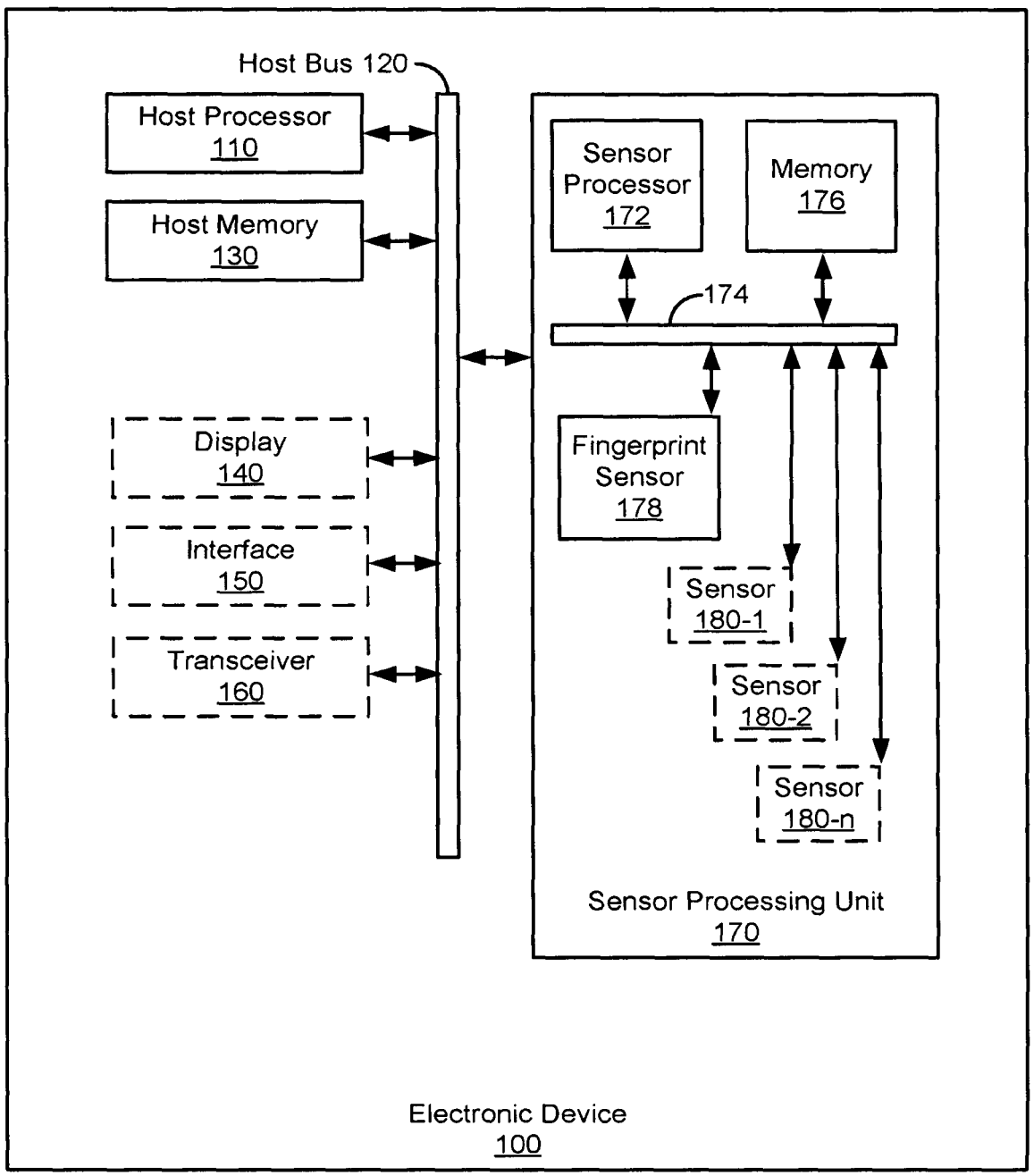
FIG. 1 illustrates a block diagram of an example mobile electronic device upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description. Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "performing," "generating," "selecting," "adjusting," "comparing," "prioritizing," "modifying," "adding," associating," "authenticating," "updating," "forwarding," or the like, refer to the actions and processes of an electronic device such as an electrical circuit.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example electronic device with which or upon which various embodiments described herein may be implemented. Examples of generation of a synthetic fingerprint image are then described. Examples of authentication of a fingerprint image by comparing the fingerprint image to a synthetic fingerprint image are then described. Example operations for the generation of a synthetic fingerprint image and authentication using a synthetic fingerprint image are then described.

Fingerprint sensors, in accordance with the described embodiments, are used for capturing fingerprint images that are used for performing fingerprint authentication at a matcher. A matcher compares a fingerprint image to at least one stored fingerprint image (e.g., image acquired during enrollment of the user) and authenticates the user of the sensor based on the comparison. Fingerprint images can vary widely depending on the condition of the finger, e.g., due to environmental conditions. For example, the temperature of the finger and/or the fingerprint sensor impacts the contrast of the fingerprint image. Water on the finger and/or fingerprint sensor can create dark fingerprint images with low contrast.

Typically, enrollment of a user's fingerprint is performed at ambient conditions, resulting in an appropriate amount of contrast to generate suitable fingerprint images for user authentication. During enrollment, a set of enrollment images is typically created, e.g., 10-20 fingerprint images. The set of enrollment images is used for comparison to fingerprint images acquired during user authentication. During usage, the set of enrollment images can be dynamically updated by adding, removing, or replacing enrollment images with authenticated fingerprint images, thus enabling the fingerprint authentication to adapt progressively to conditions. By dynamically updating the enrollment images, the performance of user authentication typically improves over time.

The dynamic updating of the enrollment images allows for improved performance in difficult use cases, e.g., where environmental conditions have an adverse impact on capturing an authentication image. For example, immediately after enrollment, and for a short time thereafter, the enrollment images typically do not have sufficient time to adapt for use in authenticating fingerprint images captured under adverse conditions, as the dynamic updating typically requires several images in order to adapt to the adverse conditions. This is particularly evident during the authentication of the first images acquired in adverse conditions.

Embodiments described herein improves the performance of fingerprint authentication using initial enrollment images by generating synthetic enrollment images that appear comparable to enrollment images acquired under particular conditions, also referred to herein as "predefined" conditions. In some embodiments, one or more enrollment images are subjected to a transfer function that simulates a non-ambient or non-ideal potential use case for fingerprint image acquisition. A transfer function is a function that transforms a fingerprint image to an image with image characteristics of a target condition. It should be appreciated that different target conditions are associated with different transfer functions. For example, the target conditions can include, without limitation: a low temperature transfer function, a high temperature transfer function, a water transfer function, and a greasy/oily transfer function. For instance, applying a water transfer function to an initial enrollment image provides a synthetic enrollment image that simulates a fingerprint image acquired under wet conditions.

Embodiments described herein provide methods for fingerprint authentication in which a fingerprint image is received from a fingerprint sensor. Fingerprint authentication of the fingerprint image is performed by comparing the fingerprint image to a set of authentication fingerprint images including at least one enrollment fingerprint image and at least one transformed fingerprint image. The transformed fingerprint image is generated by applying a transfer function to at least one enrollment fingerprint image of the set of authentication fingerprint images, where the transfer function is for simulating fingerprint image acquisition during a predefined environmental condition.

Example Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, an fingerprint sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown).

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental conditions. In one example, sensor 180-1 may comprise an acoustic sensor, sensor 180-2 may comprise a temperature sensor, and sensor 180-n may comprise a motion sensor.

In some embodiments, fingerprint sensor 178 and/or one or more sensors 180 may be implemented using a microelectromechanical system (MEMS) that is integrated with sensor processor 172 and one or more other components of SPU 170 in a single chip or package. Although depicted as being included within SPU 170, one, some, or all of fingerprint sensor 178 and/or one or more sensors 180 may be disposed externally to SPU 170 in various embodiments.

Figure 2:
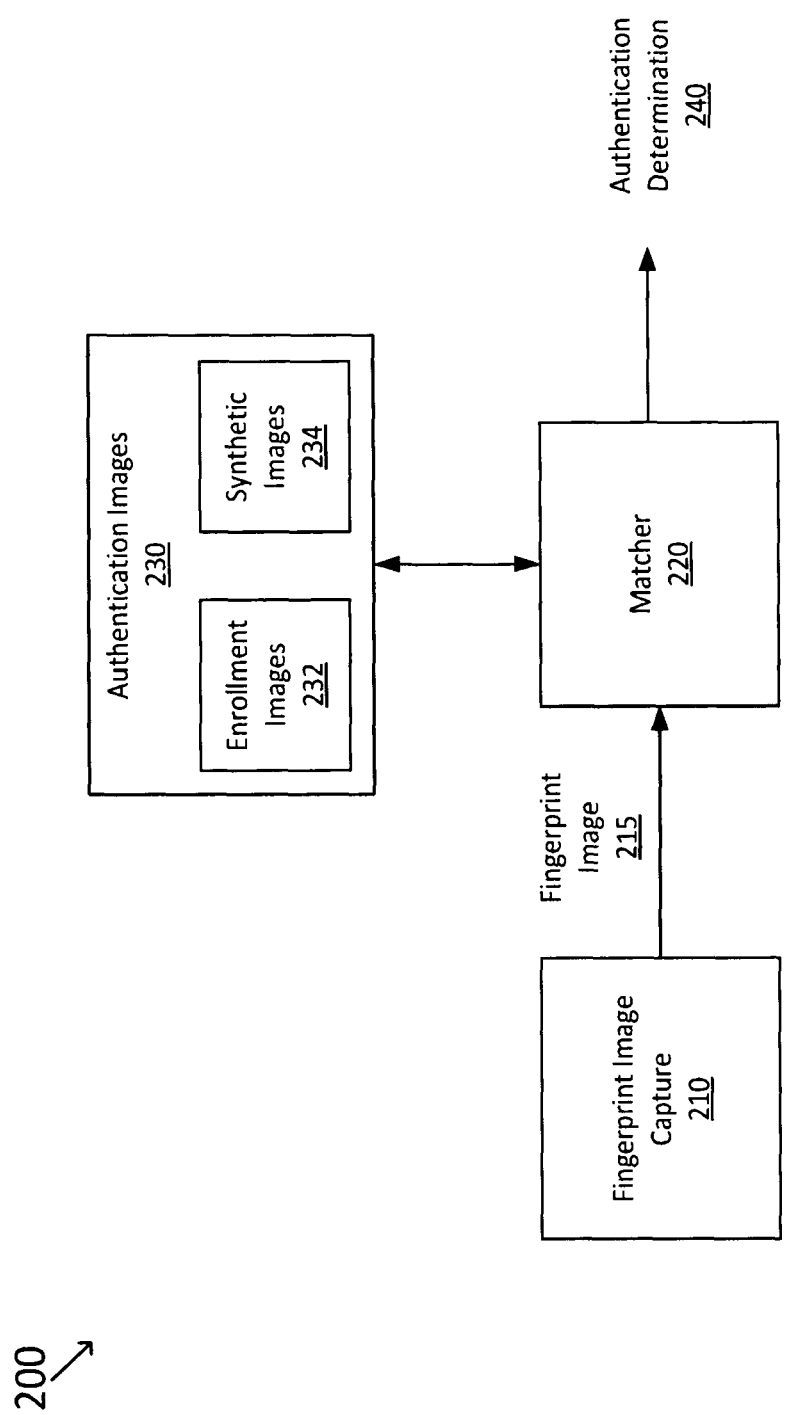
FIG. 2 illustrates a block diagram of an example fingerprint authentication system for performing fingerprint authentication against a synthetic image, according to some embodiments.

Example Generation of a Synthetic Fingerprint Image and Example Fingerprint Authentication Using a Synthetic Fingerprint Image FIG. 2 illustrates a block diagram of an example fingerprint authentication system 200 for performing fingerprint authentication against a synthetic image, according to some embodiments. Fingerprint authentication system 200 is configured to perform fingerprint authentication on a captured fingerprint image 215 against authentication images 230. Fingerprint image 215 is captured at fingerprint image capture 210. It should be appreciated that fingerprint image capture 210 can be any type of image capture device, including without limitation, an ultrasonic sensor, an optical sensor, a camera, etc. Authentication images 230 may also be referred to as the fingerprint templates, or templates. Authentication images 230 are used as reference images for authentication. In some embodiments, these authentication images 230 may be updated after enrollment, referred to herein as a dynamic update of the fingerprint templates.

Authentication images 230 include enrollment images 232 and synthetic images 234. Enrollment images 232 include fingerprint images captured during an enrollment of a user (e.g., at fingerprint sensor). Synthetic images 234, also referred to herein as "transformed images" or "transformed fingerprint images," are generated by applying a transfer function to at least one enrollment image 232 of the set of authentication images 230. A transfer function is for simulating fingerprint image acquisition during a predefined environmental condition, also referred to herein as a "particular" environmental condition. More generally, a transfer function is for converting a fingerprint image captured under a first environmental condition to simulate a fingerprint image captured under a second environmental condition. In some embodiments, the first environmental condition may be standard room temperature conditions, referred to herein as "ambient" conditions, and the fingerprint sensor may be optimized or configured for capturing a fingerprint image under these conditions. In some embodiments, the second environmental condition may represent a less then optimal environmental condition, for example, at a temperature lower or higher than room temperature, or with a lower or higher humidity. Over time, as a result of the dynamic update of authentication images 230, enrollment images 232 and synthetic images 234 can be replaced with instances of fingerprint images 215. For example, where a fingerprint image 215 is authenticated against a synthetic image 234, the synthetic image 234 can be replaced with fingerprint image 215, since fingerprint image 215 is an actual image presumably captured according to the environmental conditions for which fingerprint image 215 is simulating. Verification of the environmental conditions may be performed before the dynamic update, e.g., using additional sensors to capture environmental conditions, or using further image analysis.

Matcher 220 is configured to receive fingerprint image 215 and perform user authentication. Matcher 220 is the part of fingerprint authentication system 200 that compares fingerprint image 215 to at least one authentication image 230 and authenticates the user based on the comparison. Based on the comparison between fingerprint image 215 and at least one authentication image 230, matcher 220 outputs an authentication determination 240, e.g., fingerprint image 215 is authenticated or fingerprint image 215 is not authenticated. Authentication determination 240 may include a confidence in the authentication, and may also include information on the authentication images used in the authentication. For example, the information may indicate if an enrollment image or a synthetic image was used for authentication. Furthermore, the information may include data on the applied transfer function for the synthetic image.

Figure 3:
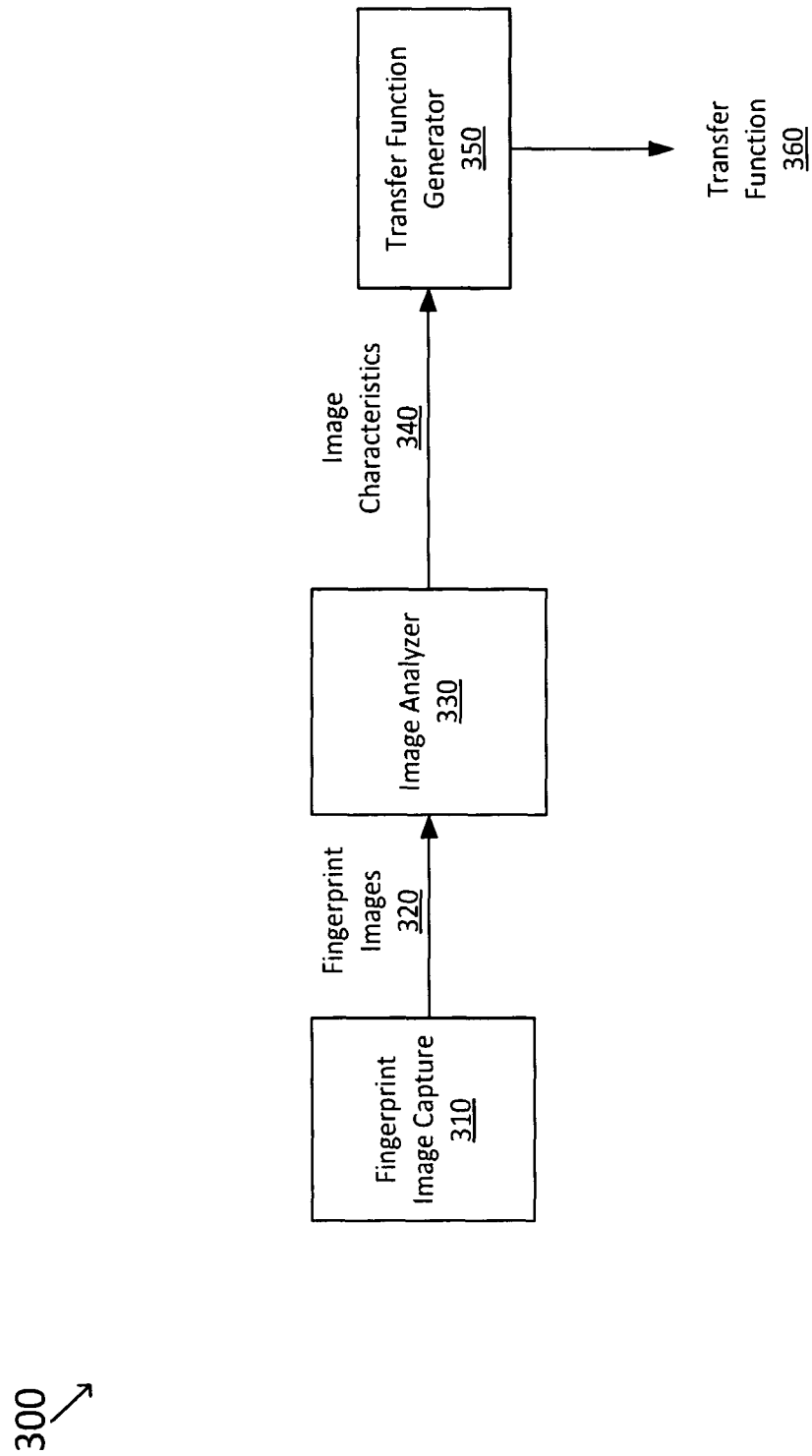
FIG. 3 illustrates a block diagram of an example system for generating a transfer function for generating a synthetic image, according to some embodiments.

Synthetic images 234 are generated by applying a transfer function to at least fingerprint image (e.g., an enrollment image 232). FIG. 3 illustrates a block diagram of an example system 300 for generating a transfer function 360 for generating a synthetic image, according to some embodiments. Fingerprint images 320 are captured at fingerprint image capture 310. It should be appreciated that fingerprint image capture 310 can be any type of image capture device, including without limitation, an ultrasonic sensor, an optical sensor, a camera, etc. In some embodiments, fingerprint images 320 are associated with a single user. In other embodiments, fingerprint images 320 are associated with multiple users (e.g., crowd-sourced).

A transfer function is a function that transforms a good quality image (e.g., an image captured under normal operating conditions) into an image with the characteristics of a target or particular condition. To generate a transfer function for a particular condition, fingerprint images 320 are captured at fingerprint image capture 310 during an ambient condition, e.g., first environmental condition, and the particular condition, e.g., the second environmental condition, and compared to determine the transfer function, where the transfer function defines a difference between the two conditions. For example, to generate a transfer function for simulating fingerprint image acquisition during a cold condition (e.g., less than 40 degrees Fahrenheit), fingerprint images 320 are captured under ambient conditions and cold conditions, and these fingerprint images 320 are compared. Similarly, to generate a transfer function for simulating fingerprint image acquisition during ambient conditions and a wet condition (e.g., water on the fingerprint or water on the image capture device), fingerprint images 320 are captured under wet conditions, and these fingerprint images 320 are compared.

Image analyzer 330 receives fingerprint images 320, and performs analysis on fingerprint images 320 to measure characteristics of fingerprint images 320 under the particular condition relative to fingerprint images 320 captured under ambient conditions. For example, images captured under wet conditions typically exhibit lower contrast and possibly higher noise than images captured under normal conditions. Image analyzer 330 measures the contrast and noise of fingerprint images 320, and generates image characteristics 340. Examples of image characteristics include, without limitation: grey value statistics, statistics on image contrast, noise standard deviation, etc. Transfer function generator 350 receives image characteristics 340, and generates transfer function 360 for simulating an image captured under the particular condition.

For example, transfer function 360 for a wet condition operates to reduce the contrast of an input fingerprint image (e.g., reduce image dynamics) and increase the noise of the input fingerprint image (e.g., Gaussian noise). Reducing contrast by a multiple reduces the signal, but also has the side effect of reducing the image noise. In order to generate a synthetic image with same image noise level, the addition of noise compensates for the reduction in noise as a result of the reduction in contrast.

It should be appreciated that transfer functions can be generated empirically or experimentally, and that in accordance with some embodiments, the transfer function is created, in whole or in part, by a human operator. In some embodiments, transfer functions are stored in the fingerprint sensor or fingerprint authentication system 200 (e.g., at host memory 130 or memory 176 of FIG. 1) As the purpose of the transfer function is to transform an input image captured under normal conditions to simulate an image captured under a target condition, it is possible that multiple different transfer functions can be generated for the same (or similar) target condition (e.g., variations between the transfer functions to cover a wider array of simulated images for the target condition). In some embodiments, transfer functions are generated automatically by determining the environmental conditions under which fingerprint images are capture, classifying the fingerprint images to certain environmental conditions, and then comparing the finger images for the different environmental conditions. It should be appreciated that this can be applied for a single user, or may also be applied for a plurality of users (e.g., crowd sourcing).

In some embodiments, a transfer function includes a modification to at least one image characteristic of a fingerprint image to simulate an image characteristic of a fingerprint image acquisition during a predefined environmental condition. In some embodiments, a transfer function includes a modification to at least one ridge-valley characteristic of a fingerprint image to simulate a ridge-valley characteristic of a fingerprint image acquisition during the predefined environmental condition. Examples of a ridge-valley characteristic include, without limitation: the ridge-valley contrast, sharpness, the slope between the darkest pixel to the brightest pixel when going from ridge to valley, etc. There might also be a difference in image noise in valley regions compared to ridge regions. For example, in cold temperatures the finger of the user may be drier, which leads to more broken ridges in the ridge/valley pattern. Therefore, the continuity, or connectedness of the ridges, may be a characteristic that is modified by the transfer function. In some embodiments, a transfer function includes an adjustment to a contrast of the at least one enrollment fingerprint image. In some embodiments, a transfer function includes an adjustment to noise of at least one enrollment fingerprint image. In some embodiments, a transfer function includes an adjustment to grey value dynamics of the at least one enrollment fingerprint image. In some embodiments, a transfer function modifies the sharpness of the ridge valley transition. In some embodiments, a transfer function modifies the ridge continuity.

In some embodiments, the predefined environmental condition is a wet condition, e.g., water on the fingerprint sensor. The transfer function includes a reduction in grey value dynamics of the fingerprint image and an increase in noise of the fingerprint image. In some embodiments, the predefined environmental condition is a cold condition, e.g., a low temperature. The transfer function includes an erosion of ridges of the enrollment fingerprint image. At cold temperatures, fingerprint ridges may become broken and/or slimmer, and the transfer function operates to simulate reduction in connectedness of ridges and/or a slimming of the ridges.

Figure 4:
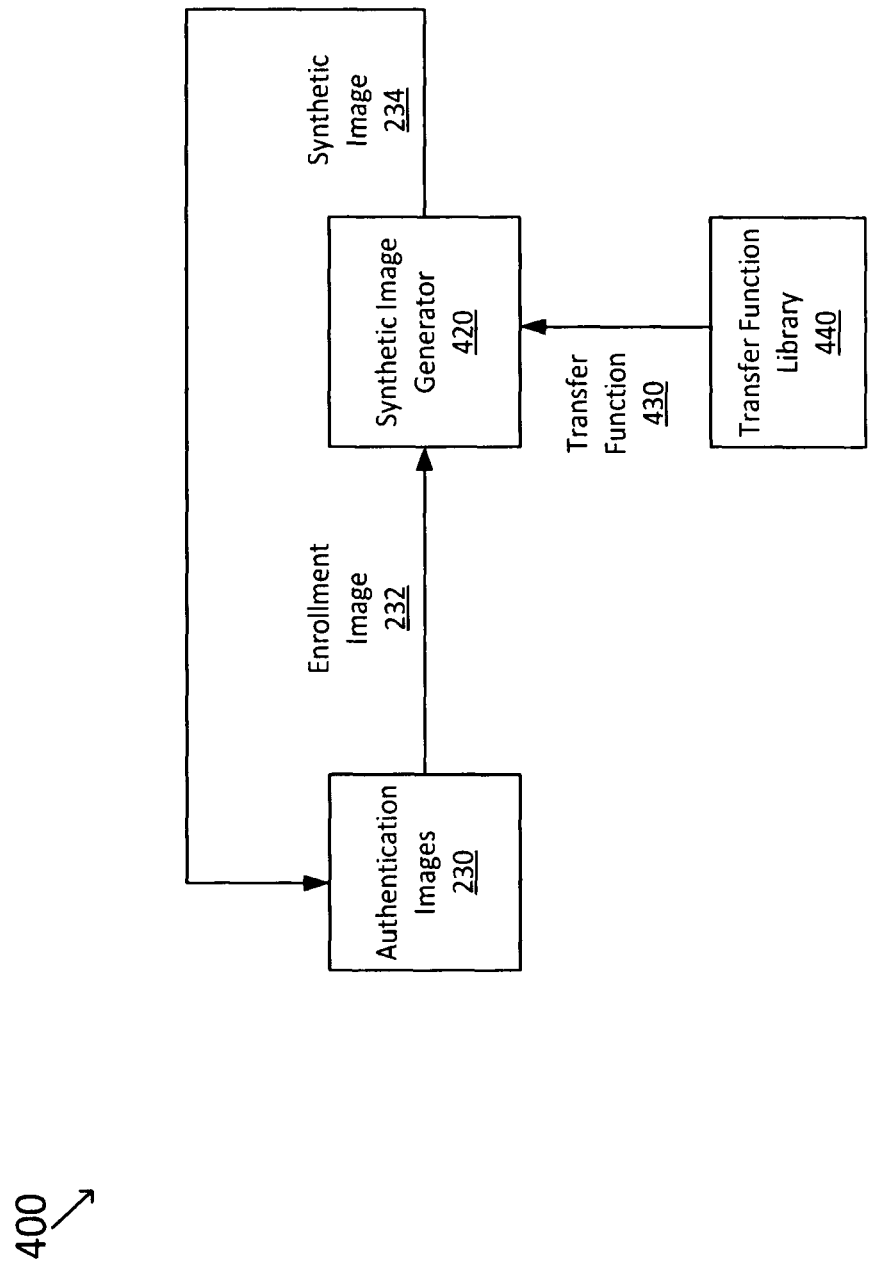
FIG. 4 illustrates a block diagram of an example system for generating a synthetic image using a transfer function, according to some embodiments.

FIG. 4 illustrates a block diagram of an example system 400 for generating a synthetic image 234 using a transfer function, according to some embodiments. It should be appreciated that the transfer function, can be generated according to system 300 of FIG. 3, determined experimentally, determined according to a neural network, determined according to machine learning, etc. System 400 accesses an enrollment image 232 from authentication images 230. Synthetic image generator 420 receives enrollment image 232 and a transfer function 430 from transfer function library 440.

Transfer function library 440 includes at least one transfer function 430 associated with a target condition. In some embodiments, transfer function library 440 can include a plurality of transfer functions 430, each associated with a particular condition. In some embodiments, the transfer functions 430 have associated data for labelling or classifying the particular conditions for which they are associated. For example, transfer function library can include transfer functions 430 associated with a cold condition, a hot condition, a wet condition, etc.

Synthetic image generator 420 is configured to generate synthetic image 234 by applying transfer function 430 to enrollment image 232. Synthetic image 234 is then added to authentication images 230 for use in authenticating a user. In some embodiments, the synthetic image 234 has associated data for labelling or classifying the particular conditions for which it is associated.

In some embodiments, synthetic image 234 is generated during or subsequent an enrollment operation. For instance, during an enrollment operation, at least one enrollment image 232 of a fingerprint of a user is captured (e.g., 15 enrollment images). During or subsequent the enrollment operation, at least one synthetic image 234 is generated to simulate fingerprint image acquisition during one or more target conditions. The one or more synthetic images 234 are then added to authentication image 230 for use in authenticating a user. It should be appreciated that over time, due to dynamic updating, that synthetic image 234 may be replaced with an actual fingerprint image acquired during a condition for which synthetic image 234 is intending to simulate.

In other embodiments, synthetic image 234 is generated during an authentication operation. In one embodiment, synthetic images 234 may be generated for all transfer functions 430 in transfer function library 440, and each of the synthetic images may be used in the authentication. It should be appreciated that the application of the transfer functions 430 may be random, predefined, or prioritized based on likelihood of relevance. By starting with the transfer function with the highest likelihood, latency may be reduced by obtained authentication as quick as possible. The transfer function ordering may be based on statistics, e.g., of prior use statistics, geolocation data statistics, etc. In one embodiment, synthetic image 234 may be generated responsive to detecting a particular environmental condition (e.g., at a sensor of the fingerprint authentication system). For example, a temperature sensor may detect a cold condition during the authentication operation, causing synthetic image generator 420 to generate synthetic image 234 using a cold transfer function. The transfer function ordering may be based on the detected environmental conditions, e.g., based on comparison of the detected environmental conditions and the corresponding environmental conditions of the transfer function. The smaller the difference in environmental conditions, the higher the transfer function is ranked (where the highest ranked transfer function is used first). In another embodiment, synthetic image 234 may be generated responsive to a failed user authentication, to confirm that the authentication failure was not due to a particular environmental condition. In some embodiments, parameters of the transfer function can be adjusted based on the environmental conditions at the fingerprint sensor. For example, for lower temperatures, a more severe change of the images is caused by the transfer function, e.g., the level of connectedness of the ridges and the contrast of the image is function of the temperature.

Figure 5:
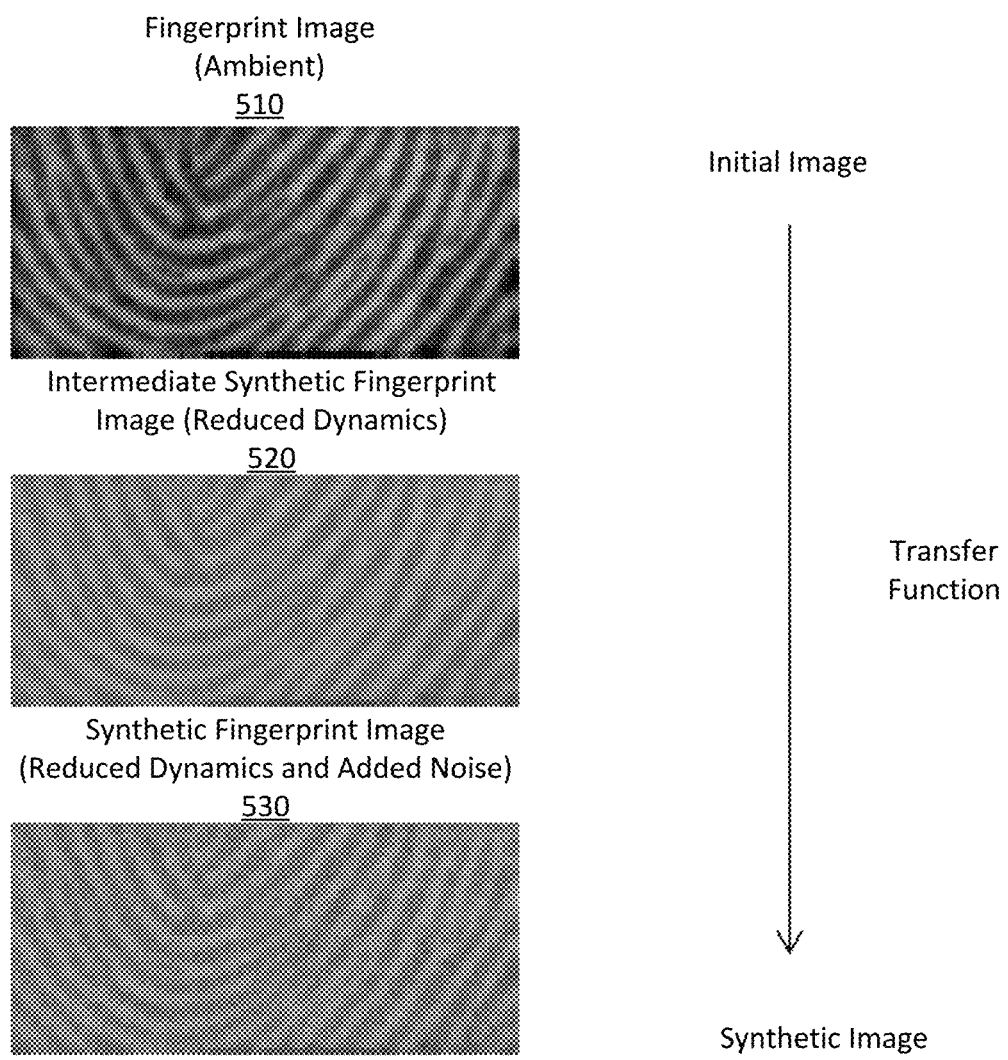
FIG. 5 illustrates an example generation of a synthetic fingerprint image simulating a wet condition, according to some embodiments.

FIG. 5 illustrates an example generation of a synthetic fingerprint image 530 simulating a wet condition, according to some embodiments. As illustrated, fingerprint image 510, acquired during ambient conditions, is the initial image received at the synthetic image generator (e.g., synthetic image generator 420). In one embodiment, fingerprint image 510 is an enrollment fingerprint image. As the transfer function for a wet condition is applied, the dynamics of fingerprint image 510 are reduced to generate intermediate synthetic fingerprint image 520. Noise is then added to intermediate synthetic fingerprint image 520, generating synthetic fingerprint image 530.

With reference again to FIG. 2, matcher 220 compares fingerprint image 215 to at least one authentication image 230 and authenticates the user based on the comparison. In some embodiments, matcher 220 compares fingerprint image 215 to a plurality of synthetic images 234. In some embodiments, comparison of fingerprint image 215 is prioritized according to environmental condition at the fingerprint sensor. For example, synthetic images 234 may include synthetic images simulating multiple conditions. If the fingerprint sensor detects a cold condition (e.g., at a temperature sensor), fingerprint image 215 may first be compared to a synthetic image 234 simulating a cold condition, and proceed to a comparison to a synthetic image 234 simulating another condition if the comparison to the synthetic image 234 simulating a cold condition fails. By prioritizing image comparison according to detected conditions, the described embodiments can improve latency during an authentication operation by comparing fingerprint image 215 to synthetic images 234 more likely to result in a positive match.

The authentication of fingerprint image 215 against a synthetic image 234 may impact performance of dynamic update of authentication images 230. In some embodiments, responsive to authenticating fingerprint image 215 against a synthetic image 234 for a particular condition, fingerprint image 215 is added to authentication images 230. The decision to replace a synthetic image with a real captured image may be based on the detected environmental conditions, and a comparison with the environmental conditions associated with the synthetic image (and its transfer function). It should be appreciated that fingerprint image 215 may replace the particular synthetic image 234, may replace another fingerprint image (e.g., an enrollment image 232), or may be added to authentication images 230 without removing or replacing any other authentication images. In some embodiments, and in some particular conditions, the transfer function for the particular condition is updated using the difference in characteristics between the authenticating fingerprint image 215 and the synthetic image 234. An example of such an updated transfer function is the use case of a user with extremely dry skin who has lower than normal contrast when cold. Using the above described mechanism allows the automatic generation of a best suited transfer function for this user. The transfer function may initially be designed for a typical user, and by adapting the transfer function, performance may be increased because the transfer function is more suited to simulate images of the particular user under different environmental conditions. For example, a standard/ initial transfer function may produce a certain connectedness of the ridges or contrast for a certain temperature. However, for the particular user in question the fingers may be drier or less dry at a certain temperature, and hence the impact of the transfer function may be adapted based on comparison of real images at a certain temperature and simulated images for that temperature.

In some embodiments, once it is determined that enough actual fingerprint images for the different conditions associated with synthetic images 234 have been stored as authentication images 230, fingerprint authentication system 200 can cease generating synthetic images 234 (e.g., cease application of transfer functions to fingerprint images). For example, authentication images 230 can be monitored, and responsive to the addition of enough actual fingerprint images associated with particular conditions of the synthetic images 234 to authentication images 230 (e.g., satisfaction of a threshold), fingerprint authentication system 200 can cease generating synthetic images 234 to reduce system latency.

In some embodiments, responsive to authenticating fingerprint image 215 against a synthetic image 234 for a particular condition, an indication that the fingerprint image was authenticated against synthetic image 234 rather than an enrollment image 232 is forwarded coincident authentication determination 240. The use of synthetic image 234 may influence the confidence in the authentication. Different applications using the authentication provided by a fingerprint sensing system may have different security requirements. For example, banking or financial applications may have higher security requirements such that authentication against a synthetic image 234 may not satisfy the authentication requirement. In such embodiments, the indication that the fingerprint image was authenticated against synthetic image 234 allows the application to make a determination as to whether the authentication is sufficient.

Figure 6:
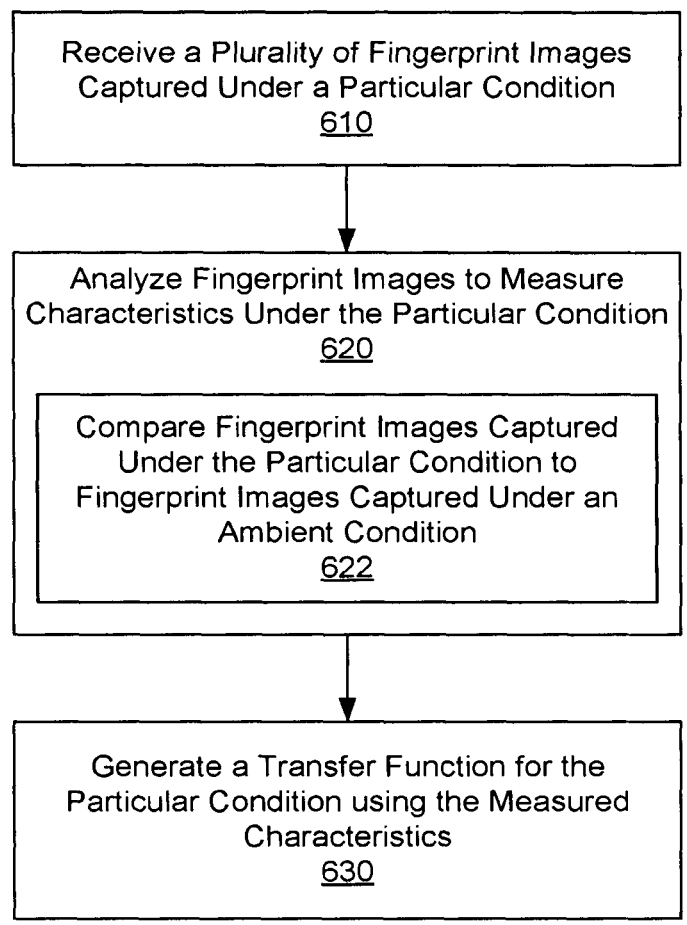
FIG. 6 illustrates a flow diagram of an example process for generating a transfer function for a particular condition, according to some embodiments.
Figure 7:
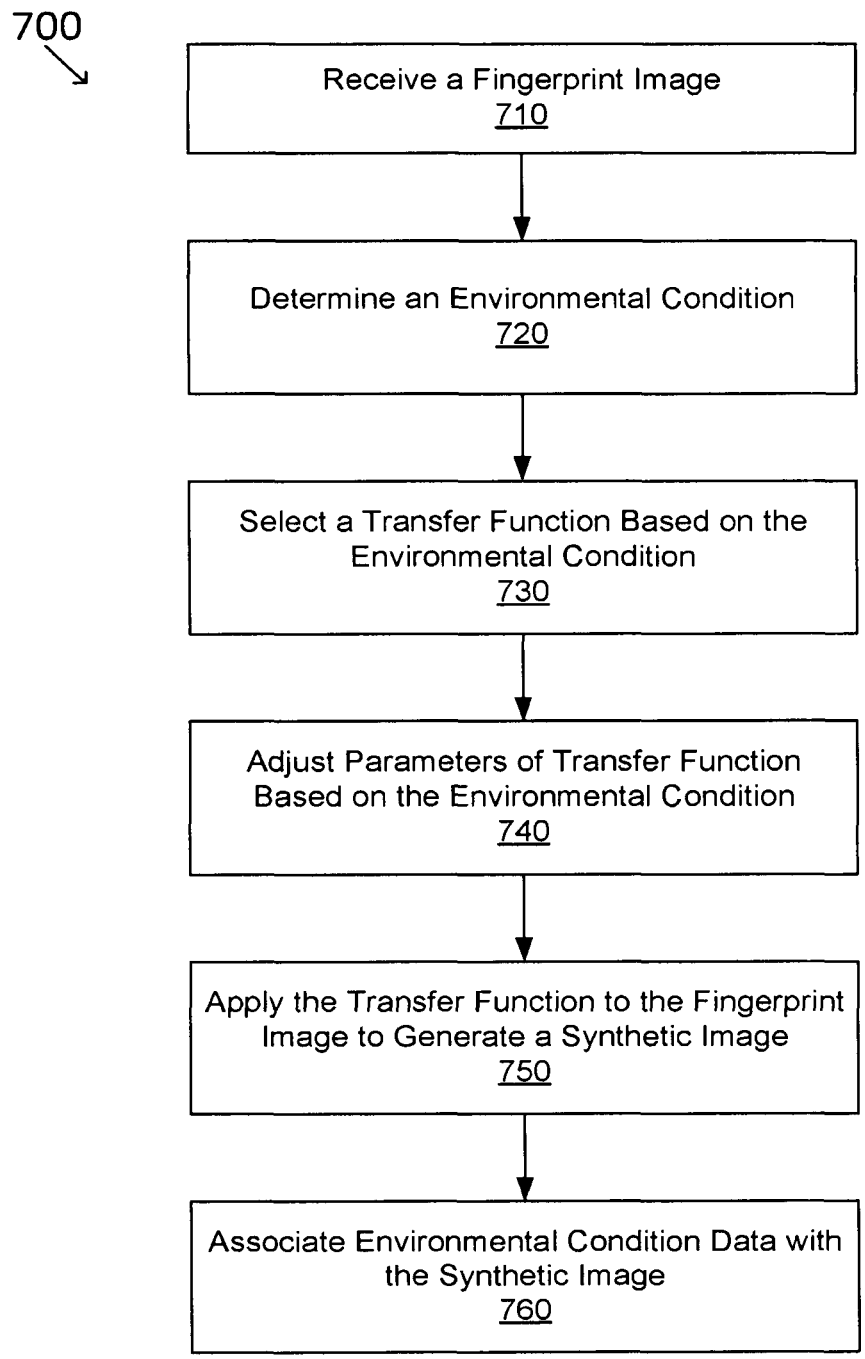
FIG. 7 illustrates a flow diagram of an example process for generating a synthetic fingerprint image using a transfer function, according to some embodiments.
Figure 8:
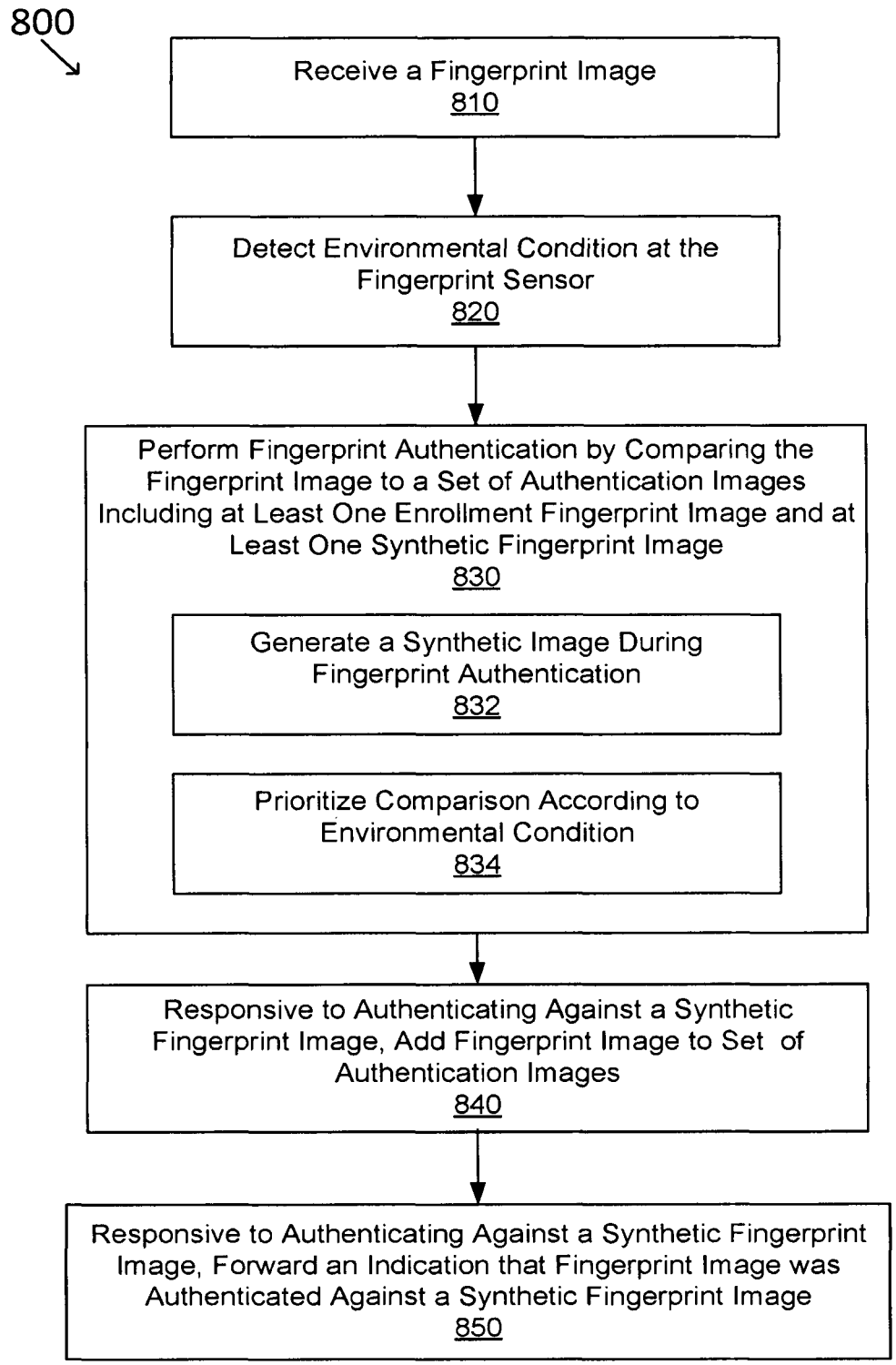
FIG. 8 illustrates a flow diagram of an example process for fingerprint authentication, according to some embodiments.

Example Operations for Generation of a Synthetic Fingerprint Image and Fingerprint Authentication Using a Synthetic Fingerprint Image FIGS. 6 through 8 illustrate flow diagrams of example methods for generation of a transfer function for a particular condition, generation of a synthetic fingerprint image using a transfer function, and fingerprint authentication, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 6, flow diagram 600 illustrates an example method for generating a transfer function for a particular condition, according to various embodiments. At procedure 610 of flow diagram 600, a plurality of fingerprint images captured under a particular condition (e.g., a particular environmental condition) are received. In some embodiments, the fingerprint images are associated with a single user. In other embodiments, the fingerprint images are associated with multiple users (e.g., crowd-sourced).

At procedure 620, the fingerprint images are analyzed to measure characteristics under the particular condition. In one embodiment, as shown at procedure 622, the plurality of fingerprint images captured under a particular condition are compared to fingerprint images captured under an ambient condition. For example, image contrast, image noise, ridge connectedness, etc., are measured, and used for determining the differences in characteristics. At procedure 630, a transfer function for the particular condition is generated using the measured characteristics, where a transfer function is for simulating fingerprint image acquisition during the particular condition when applied to a fingerprint image acquired during ambient conditions.

FIG. 7 illustrates a flow diagram 700 of an example process for generating a synthetic fingerprint image using a transfer function, according to some embodiments. At procedure 710 of flow diagram 700, a fingerprint image is received. In some embodiments, the fingerprint image is an enrollment fingerprint image generated during a user enrollment operation. In other embodiments, the fingerprint image is an authentication image used for authenticating a user (e.g., a fingerprint image added to a set of authentication images due to dynamic updating of the set of authentication images).

In some embodiments, as shown at procedure 720, an environmental condition is determined, where the environmental condition is used for simulating a fingerprint image captured during the environmental condition. In some embodiments, a temperature sensor associated with the fingerprint sensor is used to determine the environmental condition. In some embodiments, other sensors can be used to determine the environmental condition. In some embodiments, a user can select an environmental condition.

At procedure 730, a transfer function is selected based on the determined environmental condition. In some embodiments, the transfer function includes a modification to at least one image characteristic of a fingerprint image to simulate an image characteristic of a fingerprint image acquisition during a predefined environmental condition. In some embodiments, the transfer function includes a modification to at least one ridge-valley characteristic of a fingerprint image to simulate a ridge-valley characteristic of a fingerprint image acquisition during the predefined environmental condition. In some embodiments, the transfer function includes an adjustment to a contrast of the at least one enrollment fingerprint image. In some embodiments, the transfer function includes an adjustment to noise of the at least one enrollment fingerprint image. In some embodiments, the transfer function includes an adjustment to grey value dynamics of the at least one enrollment fingerprint image.

In some embodiments, the predefined environmental condition is a wet condition, e.g., water on the fingerprint sensor. The transfer function includes a reduction in grey value dynamics of the fingerprint image and an increase in noise of the fingerprint image. In some embodiments, the predefined environmental condition is a cold condition, e.g., a low temperature. The transfer function includes an erosion of ridges of the enrollment fingerprint image. At cold temperatures, fingerprint ridges may become broken and/or summer, and the transfer function operates to simulate reduction in connectedness of ridges and/or a slimming of the ridges.

In some embodiments, as shown at procedure 740, parameters of the transfer function are adjusted based on the environmental condition. For example, a general transfer function for simulating a cold condition may be adjusted according to the actual detected temperature.

At procedure 750, the transfer function is applied to the fingerprint image to generate a synthetic image, also referred to as a "synthetic fingerprint image," a "transformed image," or a transformed fingerprint image." In some embodiments, as shown at procedure 760, environmental condition data is associated with the synthetic image, e.g., the synthetic image is tagged with an indication that the synthetic image is associated with a particular environmental condition, or the synthetic image includes metadata indicating that the synthetic image is associated with a particular environmental condition.

FIG. 8 illustrates a flow diagram 800 of an example process for fingerprint authentication, according to some embodiments. At procedure 810 of flow diagram 800, a fingerprint image is received from a fingerprint sensor. In some embodiments, as shown at procedure 820, an environmental condition of the fingerprint sensor is detected (e.g., a temperature, a wetness level, etc.)

At procedure 830, fingerprint authentication of the fingerprint image is performed by comparing the fingerprint image to a set of authentication fingerprint images including at least one enrollment fingerprint image and at least one synthetic (e.g., transformed) fingerprint image, wherein the synthetic fingerprint image is generated by applying a transfer function to a fingerprint image (e.g., an enrollment fingerprint image of the set of authentication fingerprint images), and where the transfer function is for simulating fingerprint image acquisition during a predefined environmental condition.

In some embodiments, at least one synthetic fingerprint image is generated and stored during an enrollment for generating the set of authentication fingerprint images. In some embodiments, as shown at procedure 832, the at least one synthetic fingerprint image is generated by applying the transfer function to the at least one enrollment fingerprint image during the fingerprint authentication. In some embodiments, procedure 832 is performed according to at least some of the procedures of flow diagram 700.

In some embodiments, the set of authentication fingerprint images includes a plurality of synthetic fingerprint images, wherein at least two synthetic fingerprint images are generated using different transfer functions for simulating fingerprint image acquisition during different predefined environmental conditions. In some embodiments, as shown at procedure 834, a comparison of the fingerprint image to the plurality of synthetic fingerprint images is prioritized according to the environmental conditions at the fingerprint sensor.

In some embodiments, as shown at procedure 840, responsive to authenticating the fingerprint image against the at least one synthetic fingerprint image, the fingerprint image is added to the set of authentication fingerprint images (e.g., dynamic updating of the set of authentication fingerprint images).

In some embodiments, as shown at procedure 850, responsive to authenticating the fingerprint image against the at least one synthetic fingerprint image, an indication that the fingerprint image was authenticated against the at least one transformed fingerprint image is forwarded.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for fingerprint authentication, the method comprising:

during a fingerprint enrollment operation, generating at least one transformed fingerprint image for use in a fingerprint authentication operation, the generating the at least one transformed fingerprint image comprising:
receiving an enrollment fingerprint image from a fingerprint sensor;
determining at least one environmental condition for use in simulating a fingerprint image captured during the at least one environmental condition;
selecting at least one transfer function corresponding to the at least one environmental condition;
for each transfer function, applying the at least one transfer function to the enrollment fingerprint image to generate the at least one transformed fingerprint image, wherein each transformed fingerprint image simulates an enrollment fingerprint image captured during a corresponding environmental condition; and
storing the enrollment fingerprint image and the at least one transformed fingerprint image; and during the fingerprint authentication operation, authenticating a fingerprint image, the authenticating the fingerprint image comprising:
receiving the fingerprint image from the fingerprint sensor;
detecting an environmental condition at the fingerprint sensor;
comparing the fingerprint image to a set of authentication fingerprint images comprising the at least one enrollment fingerprint image and the at least one transformed fingerprint image, the comparing the fingerprint image to the set of authentication fingerprint images comprising:
prioritizing a comparison of the fingerprint image to the set of authentication fingerprint images according to the environmental condition detected at the fingerprint sensor; and
responsive to authenticating the fingerprint image against the at least one transformed fingerprint image, adding the fingerprint image to the set of authentication fingerprint images.

2. The method of claim 1, wherein the at least one transformed fingerprint image is generated and stored during an enrollment for generating the set of authentication fingerprint images.

3. The method of claim 1, wherein the comparing the fingerprint image to the set of authentication fingerprint images comprises:
generating the at least one transformed fingerprint image by applying the transfer function to the at least one enrollment fingerprint image during the fingerprint authentication.

4. The method of claim 3, further comprising:
detecting environmental conditions at the fingerprint sensor; and
wherein the generating the at least one transformed fingerprint image by applying the transfer function to the at least one enrollment fingerprint image during the fingerprint authentication comprises:
selecting the transfer function based on the environmental conditions at the fingerprint sensor.

5. The method of claim 4, further comprising:
adjusting parameters of the transfer function based on the environmental conditions at the fingerprint sensor.

6. The method of claim 1, wherein the set of authentication fingerprint images comprises a plurality of transformed fingerprint images, wherein at least two transformed fingerprint images are generated using different transfer functions for simulating fingerprint image acquisition during different predefined environmental conditions.

7. The method of claim 1, wherein the transfer function comprises a modification to at least one image characteristic of the at least one enrollment fingerprint image to simulate an image characteristic of fingerprint image acquisition during the environmental condition.

8. The method of claim 1, wherein the transfer function comprises a modification to at least one ridge-valley characteristic of the at least one enrollment fingerprint image to simulate a ridge-valley characteristic of fingerprint image acquisition during the environmental condition.

9. The method of claim 1, wherein the transfer function comprises an adjustment to a contrast of the at least one enrollment fingerprint image.

10. The method of claim 1, wherein the transfer function comprises an adjustment to noise of the at least one enrollment fingerprint image.

11. The method of claim 1, wherein the transfer function comprises an adjustment to grey value dynamics of the at least one enrollment fingerprint image.

12. The method of claim 1, wherein the environmental condition comprises water on the fingerprint sensor, and wherein the transfer function comprises a reduction in grey value dynamics of the at least one enrollment fingerprint image and an increase in noise of the at least one enrollment fingerprint image.

13. The method of claim 1, wherein the environmental condition comprises a low temperature of the fingerprint sensor, and wherein the transfer function comprises an erosion of ridges of the at least one enrollment fingerprint image.

14. The method of claim 1, further comprising:
associating environmental condition data with the transformed fingerprint image.

15. The method of claim 1, further comprising:
responsive to authenticating the fingerprint image against the at least one transformed fingerprint image:
updating the transfer function for the environmental condition.

16. The method of claim 1, further comprising:
responsive to authenticating the fingerprint image against the at least one transformed fingerprint image:
forwarding an indication that the fingerprint image was authenticated against the at least one transformed fingerprint image.

17. The method of claim 1, wherein the transfer function is determined based on a plurality of fingerprint images acquired under different environmental conditions.

18. The method of claim 17, wherein the plurality of fingerprint images comprises fingerprint images from a plurality of users.

19. An electronic device comprising:
a fingerprint sensor;
a memory; and
a processor configured to:
during a fingerprint enrollment operation, generate at least one transformed fingerprint image for use in a fingerprint authentication operation, wherein during the fingerprint enrollment operation the processor is configured to:
receive an enrollment fingerprint image from a fingerprint sensor;
determine at least one environmental condition for use in simulating a fingerprint image captured during the at least one environmental condition;
select at least one transfer function corresponding to the at least one environmental condition;
apply the at least one transfer function to the enrollment fingerprint image for each transfer function to generate the at least one transformed fingerprint image, wherein each transformed fingerprint image simulates an enrollment fingerprint image captured during a corresponding environmental condition; and
store the enrollment fingerprint image and the at least one transformed fingerprint image;
during the fingerprint authentication operation, authenticate a fingerprint image, wherein during the fingerprint authentication operation the processor is configured to:
receive the fingerprint image from the fingerprint sensor;
detect an environmental condition at the fingerprint sensor;
compare the fingerprint image to a set of authentication fingerprint images comprising the at least one enrollment fingerprint image and the at least one transformed fingerprint image, wherein the compare comprises prioritizing a comparison of the fingerprint image to the set of authentication fingerprint images according to the environmental condition detected at the fingerprint sensor;
forward, to an application, an indication that the fingerprint image was authenticated against the at least one transformed fingerprint image responsive to authenticating the fingerprint image against the at least one transformed fingerprint image; and
add the fingerprint image to the set of authentication fingerprint images responsive to authenticating the fingerprint image against the at least one transformed fingerprint image.

20. A non-transitory computer readable storage medium having computer readable program code stored thereon for causing a computer system to perform a method for fingerprint authentication, the method comprising:

during a fingerprint enrollment operation, generating at least one transformed fingerprint image for use in a fingerprint authentication operation, the generating the at least one transformed fingerprint image comprising:
   receiving an enrollment fingerprint image from a fingerprint sensor;
   determining at least one environmental condition for use in simulating a fingerprint image captured during the at least one environmental condition;
   selecting at least one transfer function corresponding to the at least one environmental condition;
   for each transfer function, applying the at least one transfer function to the enrollment fingerprint image to generate the at least one transformed fingerprint image, wherein each transformed fingerprint image simulates an enrollment fingerprint image captured during a corresponding environmental condition; and
   storing the enrollment fingerprint image and the at least one transformed fingerprint image; and during the fingerprint authentication operation, authenticating a fingerprint image, the authenticating the fingerprint image comprising:
   receiving the fingerprint image from the fingerprint sensor;
   detecting an environmental condition at the fingerprint sensor;
   comparing the fingerprint image to a set of authentication fingerprint images comprising the at least one enrollment fingerprint image and the at least one transformed fingerprint image, the comparing the fingerprint image to the set of authentication fingerprint images comprising:
      prioritizing a comparison of the fingerprint image to the set of authentication fingerprint images according to the environmental condition detected at the fingerprint sensor; and responsive to authenticating the fingerprint image against the at least one transformed fingerprint image, forwarding, to an application, an indication that the fingerprint image was authenticated against the at least one transformed fingerprint image.

\* \* \* \* \*